United States Patent Office 3,694,412
Patented Sept. 26, 1972

3,694,412
PROCESS FOR PREPARING INTERPOLYMERS OF CARBON MONOXIDE IN THE PRESENCE OF ARYL PHOSPHINE-PALLADIUM HALIDE COMPLEX
Kenzie Nozaki, El Cerrito, Calif., assignor to Shell Oil Company, New York, N.Y.
No Drawing. Filed Mar. 4, 1971, Ser. No. 121,161
Int. Cl. C08f 1/64, 13/04
U.S. Cl. 260—63 CQ
6 Claims

ABSTRACT OF THE DISCLOSURE

High melting, high molecular weight interpolymers of carbon monoxide with at least one unsaturated compound such as the aliphatic monoolefins, i.e., ethylene, are prepared by reacting carbon monoxide with said unsaturated compounds in the presence of an aryl phosphine complex of a palladium halide and certain inert solvents.

BACKGROUND OF THE INVENTION

Interpolymers of carbon monoxide and olefins, such as ethylene, as well as processes for their preparation are known.

Such interpolymers have been prepared, for example, by heating an olefin such as ethylene in an atmosphere of carbon monoxide in the presence of a suitable catalyst including peroxy compounds such as benzoyl peroxide (Brubaker—U.S. 2,495,286) and alkyl phosphine complexes of palladium salts such as tributyl phosphine complexes (ICI—British 1,081,304).

In general, the use of peroxy catalysts requires high pressures, i.e., above 500 atmospheres and, on occasion, up to 3,000 atmospheres in order to prepare solid polymers depending, of course, on the particular catalyst, concentration, monomers, etc. Thus, normally solid ethylene/carbon monoxide polymers are prepared at pressures from about 500 atmospheres (7,500 p.s.i.) to 1,000 atmospheres (15,000 p.s.i.). Also, it is generally necessary, in order to prepare solid polymers, to employ peroxy catalysts which are free of any Friedel-Crafts catalysts.

The use of the alkyl phosphine complexes of palladium salts requires relatively high temperatures, i.e., greater than 120° C. and relatively high pressures, i.e., greater than 2,000 p.s.i. It is also known that these alkyl phosphine complexes, even at such elevated temperatures and pressures, still have relatively low reactivity, i.e., low yields of polymer.

It has now been found that the use of aryl phosphine complexes of palladium halides to catalyze the copolymerization of carbon monoxide with the unsaturated compound produces a higher yield of copolymer at reduced temperatures and pressures than heretofore possible.

SUMMARY OF THE INVENTION

The present invention provides an improved process for preparing linear, high-melting, high molecular weight interpolymers of carbon monoxide with at least one unsaturated compound, preferably an aliphatic monoolefin, and most preferably ethylene, wherein the carbon monoxide and unsaturated compound is reacted in the presence of an aryl phosphine complex of a palladium halide and certain solvents.

DESCRIPTION OF THE PREFERRED EMBODIMENT

The present invention will be described in greater detail with reference to the preparation of interpolymers of carbon monoxide and ethylene although it is understood that other suitable ethylenically unsaturated organic compound may be employed.

By "ethylenically unsaturated organic compound" is meant those compounds which contain $>C=C<$ linkage.

Examples of suitable unsaturated compounds coming within the scope of the present invention include the monoolefins, preferably containing from about 2 to 8 carbon atoms such as ethylene, propylene, butylene, iso-butylene, and pentylene; diolefins such as butadiene, isoprene, and 2-chlorobutadiene-1,3; vinylidene compounds such as vinylidene chloride; tetrafluoroethylene; vinyl halides, esters and acetals, such as vinyl acetate, vinyl chloride, vinyl chloroacetate, vinyl dimethylacetate, and vinyl trimethylacetate; vinyl ketones such as vinyl methyl ketone and vinyl ethyl ketone; vinyl hydrocarbons such as styrene, chlorostyrene and alpha-methyl styrene; acrylic and methacrylic acids, esters, amides, nitriles and acid halides; and vinyl esters of unsaturated carboxylic acids such as vinyl hexenoate, vinyl crotonate, etc. The above listing is not exhaustive and is presented as representative. Other unsaturated compounds will be apparent to one skilled in the art.

Preferred ethylenically unsaturated compounds include the monoolefins (alpha-olefins) having from 2 to 8 carbon atoms. Particularly preferred is ethylene.

The present catalyst may be prepared prior to its addition to the polymerization reactor or it may be prepared in situ, i.e., the respective reactant components may be added to the reactor prior to or at the same time the monomers are added.

In general, the amount of catalyst will vary from as little as about 0.001% to as much as 5% by weight based on the total monomers. In most instances, for a number of reasons, it is generally preferable to utilize the minimum quantity of catalyst consistent with the desired purity, yield, conversion, etc.; however, amounts from about 0.005 to about 1% have been found suitable for most applications.

Catalysts which are useful in the present process are the aryl phosphine complexes of palladium halides having the following general formula

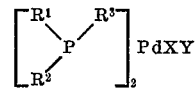

wherein $R^1$ is an aryl radical; $R^2$ and $R^3$ are alkyl or aryl radicals; X is a halogen atom and Y is a halogen atom or a hydrocarbon radical such as π-allyl. Preferably at least $R^1$ and $R^2$ are aryl radicals. Suitable such phosphine include methyl diphenyl phosphine, butyl diphenyl phosphine, ethyl diphenyl phosphine, n-butyl diphenyl phosphine.

Most preferred, however, are the triaryl radicals wherein each of the aryl radicals attached to the phosphorus atom contains no more than 12 carbon atoms, and still more preferably no more than 8 carbon atoms. Suitable preferred complexes include those derived from triphenyl phosphine, tritolyl phosphine, trixylyl phosphine, diphenyl tolyl phoshine, etc.

Two very preferred catalysts are bis(triphenyl phosphine) $PdCl_2$ and π-allyl(triphenyl phosphine) PdCl.

As noted hereinbefore, the catalyst may be prepared prior to addition to the polymerization reactor, or may be formed in situ.

The catalyst can be prepared simply by reacting a suitable trihydrocarbyl phosphine, such as triphenyl phosphine, with a palladium halide such as $PdCl_2$ or π-allyl PdCl. In general, the palladium halide is reacted with the hydrocarbon phosphine in a Pd/P ratio (mole ratio) of 1:1 to 1:10 with 1:2 to 1:5 being preferred.

The polymerization of the carbon monoxide with the ethylenically unsaturated compound can be carried out either in a batch, semi-continuous or continuous process wherein the catalyst, either preformed or formed in situ in the reactors, and the monomers are first charged into a suitable reaction vessel. The mixture is then generally heated either under autogeneous pressure or under superatmospheric pressure until the degree polymerization is achieved.

The polymerization may be performed in vessels constructed or lined with glass, steel, copper, aluminum, silver, stainless steel, etc.; however, stainless steel, or other inert metals are preferred.

In general, the polymerization process is performed at temperature ranging from about 75° to 150° C. and at pressures from slightly above atmospheric pressure to 1000 atmospheres.

It is preferred, however, to utilize temperatures of from about 75° to 125° C. and pressures from about 10 to 1000 atmospheres with from 25 to 150 atmospheres pressure being especially preferred.

In order to achieve acceptable catalyst activity and reaction rates, it is essential that the copolymerization be performed in the presence of a suitable solvent or reaction media. In general, those mediums which act as solvents for the catalyst system are suitable for use in the present process. As used herein, the medium is suitable if the catalyst solubility in said solvent is at least 0.01% by weight. It will be appreciated that one skilled in the art can conveniently select the most suitable solvent for his particular comonomer system, taking into consideration the pressures, temperatures, catalyst, catalyst concentration, etc.

Suitable media include water or any other normally liquid, nonpolymerizable, preferably volatile organic compounds including the aromatic and saturated acyclic and alicyclic hydrocarbons, ethers, esters, alcohols, amines, ketones, halogenated hydrocarbons, etc. Suitable such solvents include, among others, benzene, toluene, xylene, isooctane, cyclohexane, dioxan, t-butyl alcohol, carbon tetrachloride, acetone, kerosene, dimethyl formamide, pyridine, ethyl acetate, etc.

Especially suitable solvents include the nitrogen-containing solvents, particularly nitriles, such as acetonitrile.

As noted hereinbefore, the present catalyst, i.e., aryl phosphine complexes of a halogen-containing palladium compound may be preformed or formed in situ in the polymerization reactor.

For numerous reasons, the instant catalyst is preferably prepared in situ.

The catalyst is easily prepared in situ by simply adding a palladium halide such as $PdCl_2$ and a suitable aryl-containing phosphine such as triphenyl phosphine to the reactor in the presence of a suitable solvent. Then the carbon monoxide and ethylenically unsaturated monomer(s) are pressured into the reactor at selected pressures and the polymerization reaction allowed to proceed at selected temperatures for a time sufficient to produce the desired polymer.

In general, the ratio of palladium halide to aryl phosphine added to the reaction will vary over a limited range. The activity exhibited by the various catalysts was found to be somewhat dependent on the weight ratio of the respective components employed, the particuler monomers polymerized and the temperatue employed. In general, however, good catalysis was obtained when the weight ratio of palladium halide to aryl phosphine varied so that the mole ratio of Pd to P varied from about 1:1 to 1:10 with from 1:2 to 1:5 being prefered.

It is also noted that the present catalysts are effective catalysts for the present reaction even at temperatures below 100°, although in some instances, catalyst activity did improve at higher temperatures, up to about 125° C.

It will be appreciated that one skilled in the art can conveniently and effectively determine the most preferred range of reactants to produce the instant catalysts and the most preferred polymerization temperature by simply performing a few test runs following the instant disclosure.

In general, the monomers may be introduced into the reactor in a wide range of ratios. In general, however, it is highly desirable to use an excess of comonomers to the carbon monoxide. Thus, a very suitable mole ratio of ethylene to carbon monoxide is from about 1:1 to 25:1 with from about 3:1 to 10:1 being preferred.

The following examples are presented in order to illustrate the process of the present invention. It is understood, however, that the examples are for the purpose of illustration only and that the invention is not to be regarded as limited to any of the specific conditions or reactants recited therein. Unless otherwise indicated, parts described in the examples are parts by weight. Pressure measurements are at ambient (room) temperatures.

Example I

This example illustrates the effectiveness of a number of catalysts in the present polymerization process.

Into a 50-ml. stainless steel reactor, 0.010 gram of $PdCl_2$, 0.030 gram of triphenyl phosphine ($\phi_3P$) and 4 grams of acetonitrile were added. Then ethylene at 850 p.s.i.g. and carbon monoxide at 100 p.s.i.g. were changed to the reactor. After 19 hours at 95° C., 0.37 gram of polymer was recovered having the following properties: I.V. 0.12 dl./g. in m-cresol; M.P. 210°–225° C.

The above procedures were essentially repeated wherein various phosphines were employed in varying amounts. For comparison, tributyl phosphine was employed in lieu of the aryl phosphines. The results of representative experiments are tabulated in Table I.

The data presented in Table I clearly shows that the palladium complexes of the triaryl phosphines are superior catalysts in the polymerization of ethylene with carbon monoxide. The data further show that the use of diaryl phosphines produces less effective catalysis and that monoaryl phosphines are the least effective catalysts although slightly better than the trialkyl phosphines. On the other hand, it will be appreciated that the catalysts derived from mono-aryl phosphines are still superior to those desired from trialkyl phosphines such as tributyl phosphine since they are effective even at temperatures below 120° C. and at reduced pressure.

TABLE I

| $PdCl_2$ (g.) | Additive | Additive wt. (g.) | Pd/P (mole ratio) | Time (hr.) | Temp. (° C.) | Polymer (g.) |
|---|---|---|---|---|---|---|
| 0.010 | $\phi_3P$ | 0.014 | 1:1 | 18 | 95 | 0.06 |
| 0.010 | $\phi_3P$ | 0.030 | 1:2 | 19 | 95 | 0.37 |
| 0.010 | $\phi_3P$ | 0.045 | 1:3 | 18 | 95 | 0.50 |
| 0.010 | $\phi_3P$ | 0.060 | 1:4 | 18 | 95 | 0.75 |
| 0.010 | $\phi_3P$ | 0.092 | 1:6 | 18 | 95 | 0.23 |
| 0.010 | (P-tolyl)$_3$P | 0.036 | 1:2 | 18 | 100 | 0.70 |
| 0.010 | (m-tolyl)$_3$P | 0.036 | 1:2 | 18 | 100 | 0.70 |
| 0.010 | (o-tolyl)$_3$P | 0.036 | 1:2 | 18 | 100 | 0.00 |
| 0.010 | Lauryl $\phi_2P$ | 0.045 | 1:2 | 18 | 95 | 0.56 |
| 0.012 | $C_2H_5\phi_2P$ | 0.025 | 1:2 | 18 | 95 | 0.00 |
| 0.012 | $C_2H_5\phi_2P$ | 0.013 | 1:1 | 18 | 120 | 0.16 |
| 0.010 | $(C_2H_5)_2\phi P$ | 0.019 | 1:2 | 18 | 95 | 0.00 |
| 0.013 | $(C_2H_5)_2\phi P$ | 0.012 | 1:1 | 18 | 120 | 0.06 |
| 0.010 | (Butyl)$_3$P | 0.011 | 1:1 | 18 | 95 | 0.00 |

In related experiments, a catalyst was prepared by reacting various amounts of tributyl phosphine with various amounts of $PdCl_2$. In order to prepare a significant (measurable) amount of copolymer, it was necessary to operate at 120° C. and at 9250 p.s.i.g. for 72 hours.

It will be appreciated that although the use of (o-tolyl)$_3$E falls within the generic scope of the present invention, no measurable amount of polymer was obtained. This is believed to be the result of other factors such as steric hindrance. Thus, one skilled in the art, in the selection of a preferred catalyst, would make his selection in view of known chemical reaction principles.

Example II

This example further illustrates the superiority (increased activity and yield) of the present aryl-containing Pd catalysts over the alkyl-containing Pd catalysts.

Into a 600 ml. Hastelloy B reactor were added 50.0 g. of acetonitrile, 0.55 g. of $(\phi_3P)_2$ $PdCl_2$, 850 p.s.i.g. of ethylene and 150 p.s.i.g. of carbon monoxide with precautions taken to exclude oxygen. The reactor was heated to 120° C. with agitation by rocking. After 18 hours at 120° C., the pressure had declined by 160 p.s.i.g. and 9.3 grams of polymer was isolated by filtration and 2.0 grams was isolated from the solvent. The polymer exhibited a melting point at 215°–225° C.; was soluble in m-cresol; and had an I.V. (in m-cresol at 25° C.) of 0.11 dl./g.

The above procedure was essentially repeated wherein the catalyst consisted of 0.50 g. $PdCl_2$ and 0.58 g. $(n\text{-butyl})_3P$. After 18 hours at 120° C., only 1.85 grams of polymer was isolated having a M.P. of 210°–220° C. and an I.V. (m-cresol) of 0.12 dl./g.

Example III

This example illustrates the effectiveness of the present palladium catalysts prepared from aryl phosphine over related compounds such as phosphites, arsines, etc.

The procedures of Example I were essentially repeated wherein the triphenyl phosphine was replaced with certain related compounds.

The comparative results are tabulated in Table II. For comparative purposes, selective data presented in Table I also appear in Table II.

TABLE II

| $PdCl_2$ (g.) | Additive | Additive wt. (g.) | Time (hr.) | Temp. (° C.) | Polymer (g.) |
|---|---|---|---|---|---|
| 0.010 | $\phi_3P$ | 0.030 | 19 | 95 | 0.37 |
| 0.010 | $\phi_3P$ | 0.045 | 18 | 95 | 0.50 |
| 0.010 | $\phi_3P$ | 0.060 | 18 | 95 | 0.75 |
| 0.008 | $(\phi O)_3P$ | 0.028 | 18 | 100 | 0.0 |
| 0.008 | $(\phi O)_3P$ | 0.028 | 18 | 120 | 0.05 |
| 0.010 | $\phi_3N$ | 0.056 | 18 | 95 | 0.0 |
| 0.010 | $\phi_3As$ | 0.069 | 18 | 95 | 0.0 |
| 0.010 | $(\phi_2PCH_2)_2$ | 0.045 | 18 | 95 | 0.0 |
| 0.010 | $\phi_2PCl$ | 0.026 | 18 | 95 | 0.0 |

Example IV

This example illustrates the effectiveness of palladium-containing catalysts over catalysts containing related metals.

The procedures of Example I were essentially repeated wherein the following platinum-containing catalysts were employed: $(\phi_3P)_4Pt$, $(\phi_3P)_2PtCl_2$, $[(\phi O)_3P]Pt$ and $H_2PtCl_6\text{-}(\phi O)_3P$. None showed any activity for copolymer formation.

The procedures of Example I were again essentially repeated wherein the following nickel-containing catalysts were employed: $(\phi_3P)_2NiC_2H_4$, $[(\phi O)_3P]_4Ni$, $[(C_2H_5O)_3P]_4Ni$, $(\phi_3P)_2NiBr_2$, $Ni(CN)_2$ and $NiCl_2$ together with a variety of phosphines and phosphites including $Bu_3P$, $(\phi O)_3P$ and $(C_2H_5O)_3P$. None were found to be active for copolymer formation.

In related experiments, catalysts containing cobalt such as $(\phi_3P)_2CoCl_2$, $(\phi_3P)_3CoN_2H$ and $Co(CO)_8$ were also found inactive for copolymerization.

In other related experiments, $(\phi_3P)_3RhCl$ was also found inactive.

At this time, the only metal other than palladium whose compounds showed measurable activity was ruthenium. In related experiments, for example, $(\phi_3P)_3RuCl_2$ and mixtures of $RuCl_3$ with $\phi_3P$ showed modest activity for copolymer formation (about 0.1 g. of polymer after 18 hours at 120° C.).

Example V

This example illustrates the effectiveness of a catalyst prepared by reacting π-allyl PdCl with triphenyl phosphine compared with a catalyst prepared by reacting π-allyl PdCl with $(m\text{-butyl})_3$ phosphine.

Into a 50-ml. stainless steel reactor were placed 4 grams of acetonitrile, 850 p.s.i.g. of $C_2H_4$, 100 p.s.i.g. CO and various catalysts. After 18 hours at 100° C., the reactor was vented and the polymer recovered. The results are tabulated in Table III.

TABLE III

| Pd compound | Pd compound wt. (g.) | Additive | Additive wt. (g.) | Pd/P (mole ratio) | Polymer g. |
|---|---|---|---|---|---|
| π-Allyl PdCl | 0.012 | | | | 0.0 |
| Do | 0.009 | $\phi_3P$ | 0.023 | 0.45 | |
| π-Allyl | 0.009 | $(n\text{-Butyl})_3P$ | 0.010 | | 0.03 |

Example VI

The procedures of Example I were essentially repeated wherein 0.05 gram of $bis(\phi_3P)_2$ $PdCl_2$ were used as catalyst and propylene was used in lieu of ethylene. After 18 hours at 120° C., 0.05 gram of polymer was isolated.

I claim as my invention:

1. A process for preparing high molecular weight interpolymers of carbon monoxide and an alpha-olefin having from 2 to 8 carbon atoms in improved yield which comprises reacting said alpha-olefin and carbon monoxide in a nitrogen-containing hydrocarbon solvent at 75 to 125° C. and 25 to 150 atmosphere pressure in the presence of a catalytic amount of an aryl-phosphine complex of the general formula:

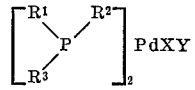

wherein $R^1$ is an aryl radical, $R^2$ and $R^3$ are alkyl or aryl radicals selected from the group consisting of phenyl, m-tolyl and p-tolyl, X is a halogen atom and Y is a halogen atom or a hydrocarbon radical, said mole ratio of alpha-olefin to carbon monoxide being from about 3:1 to 10:1.

2. A process as in claim 1 wherein the $R^1$, $R^2$ and $R^3$ are phenyl radicals.

3. A process as in claim 1 wherein the catalyst is (triphenyl phosphine)$_2$ $PdCl_2$.

4. A process as in claim 1 wherein the catalyst is π-allyl triphenyl phosphine PdCl.

5. A process as in claim 1 wherein the alpha-olefin is ethylene.

6. A process as in claim 1 wherein the solvent is acetonitrile.

References Cited

UNITED STATES PATENTS

| | | | |
|---|---|---|---|
| 3,530,109 | 9/1970 | Fenton | 260—63 |
| 2,680,763 | 6/1954 | Brubaker | 260—487 |
| 3,068,201 | 12/1962 | Michel | 260—63 |
| 3,083,184 | 3/1963 | Loeb | 260—63 |
| 2,495,286 | 1/1950 | Brubaker | 260—63 |

FOREIGN PATENTS

| | | | |
|---|---|---|---|
| 1,081,304 | 8/1967 | Great Britain | 260—63 CQ |

OTHER REFERENCES

γ-Lactones, Hayden, Chemical Abstracts, vol. 70, 1969, p. 114637p.

WILLIAM H. SHORT, Primary Examiner

L. L. LEE, Assistant Examiner

U.S. Cl. X.R.

260—94.9 B.